United States Patent
Han et al.

(10) Patent No.: US 8,972,114 B1
(45) Date of Patent: Mar. 3, 2015

(54) LEFT-RIGHT INDEPENDENT STEERING CONTROL SYSTEM AND METHOD THEREOF

(71) Applicants: Dong Seog Han, Daegu (KR); In Seok Yang, Daegu (KR)

(72) Inventors: Dong Seog Han, Daegu (KR); In Seok Yang, Daegu (KR)

(73) Assignee: Kyungpook National University Industry-Academic Cooperation Foundation, Buk-Gu, Daegu (KR)

( * ) Notice: Subject to any disclaimer, the term of this patent is extended or adjusted under 35 U.S.C. 154(b) by 0 days.

(21) Appl. No.: 14/090,160

(22) Filed: Nov. 26, 2013

(30) Foreign Application Priority Data

Sep. 5, 2013 (KR) ................. 10-2013-0106764

(51) Int. Cl.
*A01B 69/00* (2006.01)
*B62D 6/00* (2006.01)
*B62D 1/22* (2006.01)
*B62D 5/00* (2006.01)

(52) U.S. Cl.
CPC ........ *B62D 6/002* (2013.01); *B62D 1/22* (2013.01); *B62D 5/003* (2013.01)
USPC ................. 701/43; 701/41; 701/36; 180/411

(58) Field of Classification Search
CPC .......... B62D 5/003; B62D 9/00; B62D 7/159; B62D 5/0484; B62D 7/15
USPC .............. 701/41, 42, 1, 36, 43; 180/408, 411, 180/413
See application file for complete search history.

(56) References Cited

U.S. PATENT DOCUMENTS

| | | | |
|---|---|---|---|
| 7,912,606 B2 * | 3/2011 | Auguet ........................... | 701/41 |
| 8,068,955 B2 * | 11/2011 | Yanagi ........................... | 701/43 |
| 2008/0167778 A1 * | 7/2008 | Tsukasaki et al. .............. | 701/41 |

* cited by examiner

*Primary Examiner* — Gertrude Arthur Jeanglaude
(74) *Attorney, Agent, or Firm* — Porzio, Bromberg & Newman, P.C.

(57) ABSTRACT

The present disclosure relates to a left-right independent steering control system and a method thereof, particularly a left-right independent steering control system that controls the other steering system such that the steering angles of both wheels satisfy Ackerman condition, when the steering angle of a vehicle is not controlled in accordance with steering input from a driver due to a breakdown in any one of left wheel and right wheel steering systems of the vehicle, and a method thereof.

6 Claims, 2 Drawing Sheets

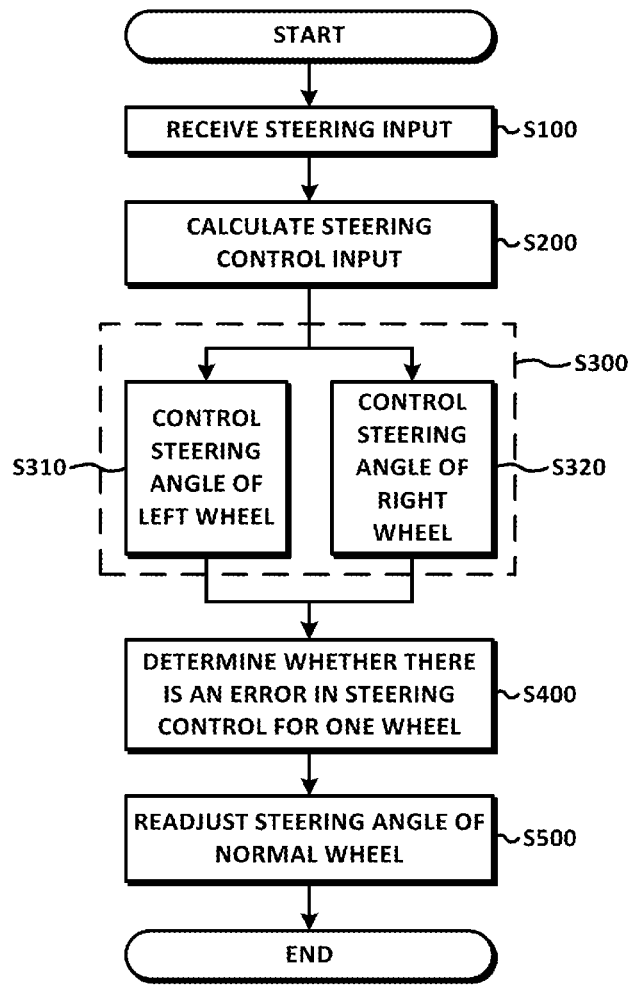

LEFT-RIGHT INDEPENDENT STEERING CONTROL SYSTEM AND METHOD THEREOF

CROSS-REFERENCE TO RELATED APPLICATIONS

This application claims the benefit under 35 U.S.C. §119 (a) of Korean Patent Application No. 10-2013-0106764 filed on Sep. 5, 2013, in the Korean Intellectual Property Office, the entire disclosure of which is incorporated herein by reference for all purpose.

BACKGROUND

1. Field

The following description relates to a left-right independent steering control system and a method thereof, particularly a left-right independent steering control system that controls the other steering system such that the steering angles of both wheels satisfy Ackerman condition, when the steering angle of a vehicle is not controlled in accordance with steering input from a driver due to a breakdown in any one of left wheel and right wheel steering systems of the vehicle, and a method thereof.

2. Description of the Prior Art

Concerning the steering control system in vehicles, various steer-by-wire (hereafter, SBW) vehicle steering systems that can freely determine steering reaction torque (or steering reaction force) applied to a steering wheel and the steering angle of a vehicle that is steered have been proposed. Those SBW vehicle steering systems for vehicles generally use a mechanical backup system at the middle of a column shaft for mechanically coupling steering input unit and output unit, using a mechanism backup system, in a back-up mode (or a fail-safe mode) that is operated by a breakdown in an SBW system.

Using a cable backup system (flexible torque transmission unit) as the mechanical backup system is very effective in terms of improving the degree of freedom in design of the layout of a cockpit, reducing vibration and noise transmitted to the steering wheel through steered wheels from a road, and removing shocks in front collision.

In particular, Korean Patent Registration No. 10-0745915 providing such a mechanical backup system discloses a configuration that makes sure of effective reduction of the minimum rotational radius by a variable pitch dual rack assembly even in a backup mode by mechanically connecting a steering input unit (steering wheel) and a steering output unit (variable pitch dual rack assembly), using a clutch, when an SBW system breaks.

However, the mechanical backup system has a problem in that the manufacturing cost is high because a specific mechanical configuration is required in addition to the SBW system, such that the entire weight of a vehicle increases. The increase in the entire weight of a vehicle causes an increase and inefficiency in use of fuel. In particular, the mechanical backup system is in the backup mode, when a vehicle is in a normal state, but it operates after a breakdown occurs, and thus, it is practically difficult to be mounted on a vehicle that normally operates, which is very inefficient.

SUMMARY

The present disclosure provides a left-right independent steering control system and a method that can satisfy Ackerman condition between both wheels by providing a breakdown management order through a vehicle network, when there is a breakdown in an SBW system.

In general aspect, there is provided a left-right independent steering control system including: a steering control calculating unit that calculates steering control input for both wheels from steering input by a driver; wheel steering units that separately adjust steering angles of both wheels on the basis of the calculated information; breakdown determining unit that determines whether the wheel steering unit for any one of both wheels breaks, by determining whether the steering angles of both wheels adjusted by the wheel steering units are the same as steering angles corresponding to the steering control input; and a breakdown management unit that adjusts the steering angle of the other wheel to satisfy Ackerman condition on the basis of the current steering angle information of one wheel when the breakdown determining unit determines that the wheel steering unit for the one wheel breaks.

The system may further include a vehicle network that transmits any one or more selected from steering input information by a driver, calculated steering control input for both wheels; steering angle information of both wheel adjusted by the wheel steering units; and a steering angle adjustment message given by the breakdown management unit, to all of modules in a vehicle.

The wheel steering unit may include: a first wheel steering unit that adjusts the steering angle of a left wheel on the basis of the calculated information; and a second wheel steering unit that adjusts the steering angle of a right wheel on the basis of the calculated information.

In another general aspect, there is provided a left-right independent steering control method including: (A) receiving steering input from a driver; (B) calculating steering control input corresponding to the received steering input; (C) separately adjusting the steering angles of both wheel on the basis of the calculated information; (D) determining whether there is an error in steering control for any one of both wheels by determining whether the steering angles of both wheel adjusted in the step (C) are the same as the steering angles corresponding to the steering control input calculated in the step (B); and (E) adjusting the steering angle of the other wheel to satisfy Ackerman condition, on the basis of the current steering angel information of one wheel, when it is determined that there is an error in the steering control for the wheel in the step (D).

Any one or more selected from steering input information by a driver, calculated steering control input for both wheels, steering angle information of both wheel adjusted by the wheel steering units, and a breakdown management message transmitted to the steering system for a wheel that normally works may be transmitted to all of modules in a vehicle through a vehicle network.

The step (C) may include: (C-1) adjusting the steering angle of a right wheel on the basis of the calculated information; and (C-2) adjusting the steering angle of a right wheel on the basis of the calculated information.

The left-right independent steering control system and method according to the present disclosure readjust the steering angle of a wheel by giving a breakdown management order to the wheel steering system for another wheel without a breakdown through a vehicle network, when there is an error in an SBW system. Therefore, it is possible to reduce the stress applied to the structure of a vehicle body by generally satisfying Ackerman condition.

BRIEF DESCRIPTION OF THE DRAWINGS

FIG. 3 is a diagram illustrating a left-right independent steering control method according another embodiment of the present disclosure.

Figure 1:
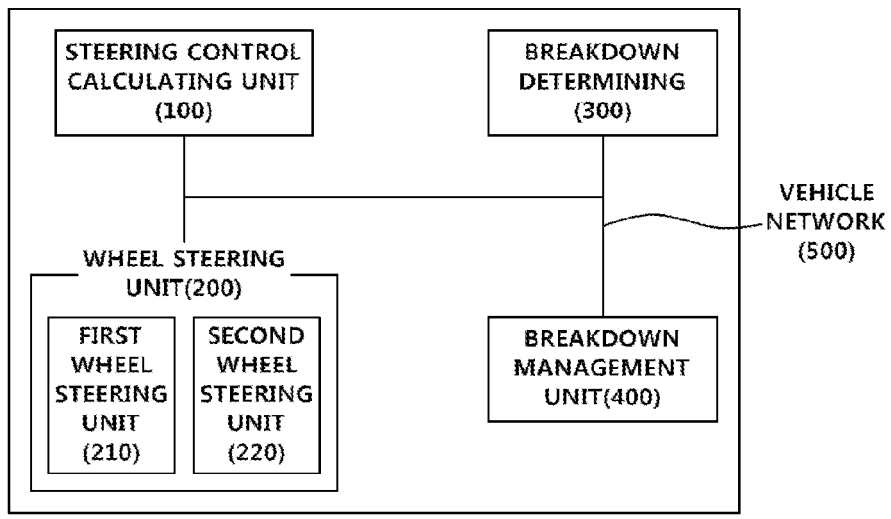
FIG. 1 is a diagram illustrating a left-right independent steering control system according to an example of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The present disclosure may be modified in various ways and implemented by various exemplary embodiments, so that specific exemplary embodiments are shown in the drawings and will be described in detail herein. However, it should be understood that the present disclosure is not limited to the specific exemplary embodiments, but includes all modifications, equivalents, and substitutions included in the spirit and the scope of the present disclosure. In describing the present disclosure, detailed descriptions of well-known technologies will be omitted so as not to obscure the description of the present disclosure.

Terms used in the specification, 'first', 'second', etc., may be used to describe various components, but the components are not to be construed as being limited to the terms. The terms are used to distinguish one component from another component.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments of the present disclosure are described in detail with reference to the accompanying drawings.

FIG. 1 is a diagram illustrating a left-right independent steering control system according to an example of the present disclosure.

As shown in FIG. 1, a left-right independent steering control system 1 according to an example of the present disclosure includes: a steering control calculating unit 100 that calculates steering control input for both wheels from steering input by a driver; a wheel steering unit 200 that adjusts the steering angles of both wheel, using the calculated information; a breakdown determining unit 300 that determines whether there is an error in steering control for any one of both wheels by determining whether the steering angles of both wheels adjusted by the wheel steering unit 200 are the same as a steering wheel corresponding to the steering control input; and a breakdown management unit 400 that adjusts the steering angle of a second wheel to satisfy Ackerman condition on the basis of the information on the current steering angle of a first wheel, when the breakdown determining unit 300 determines that there is an error in steering control of the first wheel.

The steering control calculating unit 100 calculates steering control input for both wheels by analyzing the steering input, when a driver provide an input for steering through a specific steering wheel. In detail, when a driver turns a steering wheel in any one direction, the steering control calculating unit 100 calculates control output for how to steer the wheels, using the angle information of the steering wheel turned by the driver. The steering control input may include the information on the steering angles to be adjusted for the wheels.

In an embodiment that can be applied to the present disclosure, the steering control calculating unit 100 can calculate steering control input for the front wheels of a vehicle in accordance with steering input of a driver and can perform control to satisfy the following Expression 1 when calculating steering information to adjust for the left and right front wheels.

$$\cot\delta_o - \cot\delta_i = \frac{w}{l} \qquad \text{[Expression 1]}$$

where δo and δi are the steering angles of the inside and outside wheels in turning, respectively, w is the transverse length of the vehicle, and l is the distance from the front wheel to the rear wheel.

That is, the steering control calculating unit 100 reduces stress applied to the structure of the vehicle body made of rigid bodies by performing control to satisfy Ackerman condition, when calculating steering input for the left and right front wheels of a vehicle in accordance with steering input by a driver.

The wheel steering unit 200 adjusts the steering angles of both wheels, using the steering input information calculated by the steering control calculating unit 100. All of technical configurations that easily individually adjust the steering angles of both wheels can be used for the wheel steering unit 200.

For example, in an embodiment that can be applied to the present disclosure, the wheel steering unit 200 may include a first wheel steering unit 210 that adjusts the steering wheel of the left wheel, using the steering control input information and a second wheel steering unit 220 that adjusts the steering angle of the right wheel, using the steering control input information. That is, the wheel steering units 200 that adjust the steering angles of both wheels are implemented by distinguishable modules and can receive steering control input information from the steering control calculating unit 100 and adjust the steering angles of the wheels, respectively, in accordance with the information.

As described above, since the wheel steering units 200 adjusting the steering angles of both wheels are independently implemented, when there any one of the wheel steering units 200 breaks, only the wheel steering unit 200 can be easily replaced.

Alternatively, in another embodiment of the present disclosure, the technical configuration of adjusting the steering angles of both wheels may be implemented by one module. In detail, the wheel steering unit 200 may be implemented by including a technical configuration, which receives steering control input information from the steering control calculating unit 100 and adjusts the steering angles of left and right wheel, in one module.

However, the embodiments are examples of the wheel steering unit 200 and various technical configurations that can adjust the steering angles of both wheels, other than the embodiments, may be used for the wheel steering unit 200.

The breakdown determining unit 300 determines whether there is an error in steering control for any one of both wheels by determining whether the steering angles of both wheels adjusted by the wheel steering unit 200 are the same as the steering angles corresponding to the steering control input. In detail, the breakdown determining unit 300 compares the steering control input information calculated by the steering control calculating unit 100 with the degrees of the steering angles of both wheels which is practically adjusted by the wheel steering unit 200, and determines whether the wheel steering unit 200 is in correct operation according to the steering control input information.

In an embodiment that can be used in the present disclosure, the breakdown determining unit 300 can determine whether one of the wheel steering unit 200 for one wheel breaks by determining whether the steering angle information on both wheels to adjust on the basis of the calculated steering control input information is the same as or different from the steering angle information on both wheels practically adjusted by the first and second wheel steering units 220.

Four types of breakdowns of the first wheel steering unit 210 (or the second wheel steering unit 220) are as follows.

Figure 2:
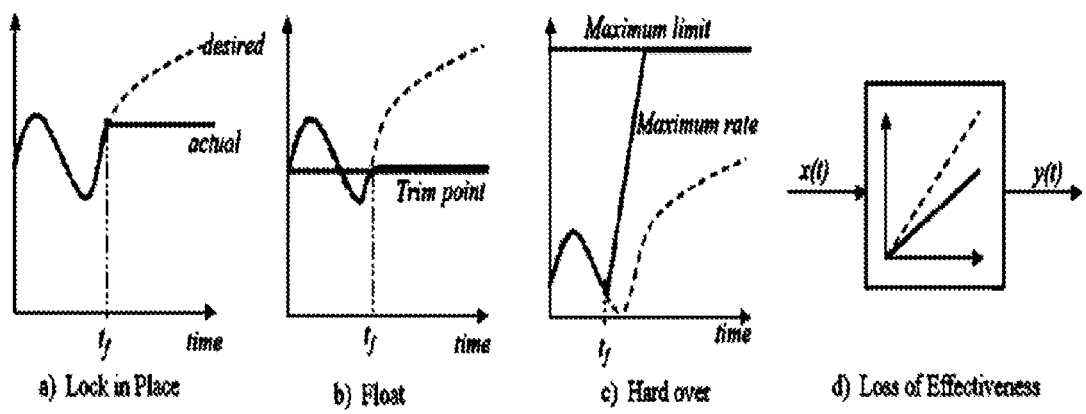
FIG. 2 is a diagram illustrating four types for breakdown in a steering system.

FIG. 2 is a diagram illustrating four types for breakdown in a steering system.

As shown in FIG. 2, the types of breakdown in a steering system are a) when an output value is not adjusted to a predetermined output value or more (Lock in Place), b) when the output value cannot be controlled from a specific point (Float), c) when the output value reaches the maximum critical value (Hard over), and d) when the efficiency of the output is less than an estimated value.

The first wheel steering unit 210 (or the second wheel steering unit 220) may adjust the steering angle of the left (or the right) wheel differently from a desired angle due to any one selected from the four types of breakdown. For example, when the first wheel steering unit 210 breaks in the type d) and the performance decreases to 50%, the first wheel steering unit 210 steers the left wheel only by the steering angle with the performance decreased 50% from the steering control input (the desired steering angle of the left wheel).

The breakdown determining unit 300 can determine whether the left wheel has been adjusted by the desired value through the steering control input, by comparing the steering control input information with the information on the steering angle of the left wheel practically steered by the first wheel steering unit 210. That is, it is possible to determine whether there is a breakdown in the wheel steering units 200 by determining whether both wheels have been correctly adjusted in accordance with the output value by the steering control input.

When the breakdown determining unit 300 determines that there is a breakdown in any one of the wheel steering unit 200, the breakdown management unit 400 adjusts the steering wheel of the other wheel to satisfy Ackerman condition on the basis of the current steering angle information of one wheel. Hereinafter, it is assumed that there is a breakdown of a performance decrease of 50% in the first wheel steering unit 210, as in the embodiment described above.

The breakdown management unit 400 determines that the first wheel steering unit 210, that is, the left wheel steering unit 200 breaks through the breakdown determining unit 300 and readjusts the steering angle of the right wheel to the current steering angle of the left wheel.

For example, in order to turn right a vehicle, the left wheel is steered only by 50% ($\delta L/2$, hereafter, $\delta L'$) of a desired angle $\delta L$ by the first wheel steering unit 210. In contrast, the right wheel is steered by a desired angle $\delta R$ by the second wheel steering unit 220 which normally works. That is, the desired angles $\delta L$ and $\delta R$ satisfy Ackerman condition in the following Expression 2, but Ackerman condition as in the following Expression 3 is not satisfied between the actually steered angles $\delta L'$ $\delta R$ of both wheels.

$$\cot\delta_L - \cot\delta_R = \frac{w}{l} \quad \text{[Expression 2]}$$

$$\cot\delta'_L - \cot\delta_R \neq \frac{w}{l} \quad \text{[Expression 3]}$$

where w is the transverse length of a vehicle and l is the distance from a front wheel to a rear wheel. Accordingly, the breakdown management unit 400 readjusts the steering angle $\delta R'$ of the right wheel to the actual steering angle $\delta L'$ of the left wheel. That is, the breakdown management unit 400 recalculates the steering angle $\delta R'$ of the right wheel from the following Expression 4 and controls the second wheel steering unit 220 to steer the right wheel by the readjusted steering angle $\delta R'$. The breakdown management unit 400 can give a breakdown management order for steering again the right wheel by the readjusted steering angle $\delta R'$ to the second wheel steering unit 220.

$$\delta'_R = \cot^{-1}\left(\cot(\delta'_L) - \frac{w}{l}\right) \quad \text{[Expression 4]}$$

where w is the transverse length of a vehicle and l is the distance from a front wheel to a rear wheel. Expression 4 corresponds to turning right, but for turning left, the left wheel is at the inside and the right wheel is at the outside, such that the recalculated steering angle $\delta R'$ of the right wheel is obtained, as in the following Expression 5.

$$\delta'_R = \cot^{-1}\left(\cot(\delta'_L) + \frac{w}{l}\right) \quad \text{[Expression 5]}$$

where w is the transverse length of a vehicle and l is the distance from a front wheel to a rear wheel. The breakdown management unit 400 recalculates the steering angle of the other wheel to satisfy Ackerman condition on the basis of the current steering angle of the broken wheel through the method described above and readjusts the steering angle of the other wheel by giving the recalculated steering angle information as a breakdown management order to the corresponding wheel steering unit 200.

With the configuration described above, when thee steering control system for the left or right wheel does not normally work, it is possible to obtain structural safety by readjusting the steering angle of the wheel that normally works (non-broken wheel) on the basis of the current steering angle information of the broken wheel.

The left-right independent steering control system 1 according to an embodiment that can be used in the present disclosure may further include a vehicle network 500 for transmitting related information between all of the modules in a vehicle. The vehicle network 500 may be one or more network bus systems for a vehicle which are selected from CAN (Controller Area Network), LIN (Local Interconnect Network), FlexRay, MOST (Media Oriented Systems Transport), and IVN (In-Vehicle Network). That is, in an embodiment that can be used in the present disclosure, steering input information A by a driver, calculated steering control input B for both wheels, steering angle information of both wheels adjusted by the wheel steering unit 200, and breakdown management messages D given by the breakdown management unit 400 can be transmitted by any one or more of the vehicle network methods.

For example, the information A and B may be transmitted through the CAN and LIN buses and the information C and D may be transmitted through the FlexRay bus.

However, this is only an example and the vehicle network 500 that can be used in the present disclosure is not limited thereto.

Hereinafter, a left-right independent steering control method according to the present disclosure is described in detail with reference to FIG. 3.

FIG. 3 is a diagram illustrating a left-right independent steering control method according another embodiment of the present disclosure.

As shown in FIG. 3, the left-right independent steering control method according to an embodiment that can be used in the present disclosure includes: (A) receiving steering input from a driver; (B) calculating steering control input corresponding to the received steering input; (C) separately adjusting the steering angles of both wheels on the basis of the calculated information; (D) determining whether there is an error in steering control for any one of both wheels by determining whether the steering angles of both wheels adjusted in the step (C) are the same as the steering angles corresponding to the steering control input calculated in the step (B); and (E) adjusting the steering angle of the other wheel to satisfy Ackerman condition, on the basis of the current steering angle information of one wheel, when it is determined that there is an error in the steering control for the wheel.

A driver can input steering information for a vehicle, using a steering wheel in the vehicle and the vehicle receives the steering input through the method described above (S100).

When the steering input is received in the step S100, steering control input corresponding to the received steering input is calculated (S200). In detail, when a driver turns a steering wheel in any one direction, control output for how to steer the wheels is calculated in the step S200 on the angle information of the steering wheel turned by the driver. The steering control input may include the information on the steering angles to be adjusted for the wheels.

In an embodiment that can be applied to the present disclosure, it is possible in the step S200 to calculate steering control input for the front wheels of a vehicle in accordance with steering input of a driver and can perform control to satisfy the following Expression 6 when calculating steering information to adjust for the left and right front wheels.

$$\cot\delta_o - \cot\delta_i = \frac{w}{l}$$ [Expression 6]

where δo and δi are the steering angles of the inside and outside wheels in turning, respectively, w is the transverse length of the vehicle, and l is the distance from the front wheel to the rear wheel.

That is, in the step S200, the stress applied to the structure of the vehicle body made of rigid bodies is reduced by performing control to satisfy Ackerman condition, when steering input for the left and right front wheels of a vehicle is calculated in accordance with steering input by a driver.

The steering angles of both wheels are separately adjusted on the basis of the information calculated in the step S200 (S300). The step S300 may include adjusting the steering angle of the left wheel on the basis of the calculated information (S310) and adjusting the steering angle of the right wheel on the basis of the calculated information (S320).

That is, the technical configuration of adjusting the steering angles of both wheels may be implemented by different modules and the modules can differently adjust the steering angles of both wheels through the step S310 or step S320.

Whether the steering angles of both wheels adjusted through the step S300 are the same as the steering angles corresponding to the steering control input calculated in the step S200 is determined and whether there is an error in steering control for any one o both wheels is determined (S400). In detail, in the step S400, the steering control input information calculated through the step S200 and the information on the steering angles of both wheels actually adjusted in the step S300 are compared and whether both wheels correctly work in accordance with the steering control input information is determined through the step S300.

In an embodiment that can be used in the present disclosure, it is possible in the step S400 to determine whether any one of the wheels breaks, by determining whether the steering angle information of both wheels expected through the steering control input information calculated in the step S400 is the same as or different from the steering angle information of both wheels of which the steering angles are actually adjusted. One wheel may breaks in the four types of breakdown as in FIG. 2 and the related detailed description was described above and is not provided below.

When it is determined there is an error in steering control for any one wheel in the step S400, the steering angle of the other wheel is adjusted to satisfy Ackerman condition on the basis of the current steering angle information of the wheel (S500). As in the previous example, it is assumed that there is a breakdown of a 50% performance decrease in the wheel steering system for the left wheel.

In the step S500, it is determined that there is an error in steering control for the left wheel and the steering angle of the right wheel is readjusted to the current steering angle of the left wheel.

For example, in order to turn right a vehicle, the broken left wheel is steered only by 50% (δL/2, hereafter, δL') of the desired angle δL. On the contrary, the right wheel that normally works is steered by a desired angle δR. That is, the desired angles δL and δR satisfy Ackerman condition in the following Expression 7, but Ackerman condition as in the following Expression 8 is not satisfied between the actually steered angles δL' δR of both wheels.

$$\cot\delta_L - \cot\delta_R = \frac{w}{l}$$ [Expression 7]

$$\cot\delta'_L - \cot\delta_R \neq \frac{w}{l} \quad \text{[Expression 8]}$$

where w is the transverse length of a vehicle and l is the distance from a front wheel to a rear wheel. Accordingly, in the step S500, the steering angle δR' of the right wheel is readjusted to the actual steering angle δL' of the left wheel. That is, in the step S500, the steering angle δR' of the right wheel is recalculated from the following Expression 9 and the right wheel is steered by the readjusted steering angle δR'. To this end, a breakdown management order for steering the right wheel by the readjusted steering angle δR' can be transmitted to the steering system for the right wheel.

$$\delta'_R = \cot^{-1}\left(\cot(\delta'_L) - \frac{w}{l}\right) \quad \text{[Expression 9]}$$

where w is the transverse length of a vehicle and l is the distance from a front wheel to a rear wheel. Expression 9 corresponds to turning right, but for turning left, the left wheel is at the inside and the right wheel is at the outside, such that the recalculated steering angle δR' of the right wheel is obtained, as in the following Expression 10.

$$\delta'_R = \cot^{-1}\left(\cot(\delta'_L) + \frac{w}{l}\right) \quad \text{[Expression 10]}$$

where w is the transverse length of a vehicle and l is the distance from a front wheel to a rear wheel. In the step S500, the steering angle of the other wheel is recalculated to satisfy Ackerman condition on the basis of the current steering angle of the broken wheel through the method described above and the steering angle of the other wheel is readjusted by giving the recalculated steering angle information as a breakdown management order to the corresponding wheel steering system.

With the configuration described above, when thee steering control system for the left or right wheel does not normally work, it is possible to obtain structural safety by readjusting the steering angle of the wheel that normally works (non-broken wheel) on the basis of the current steering angle information of the broken wheel.

In the left-right independent steering control method according to an embodiment that can be used in the present disclosure, all of the inter-module information in a vehicle can be transmitted to all the modules in the vehicle through a vehicle network. The vehicle network may be one or more network bus systems for a vehicle which are selected from CAN (Controller Area Network), LIN (Local Interconnect Network), FlexRay, MOST (Media Oriented Systems Transport), and IVN (In-Vehicle Network). That is, in an embodiment that can be used in the present disclosure, steering input information A by a driver, calculated steering control input B for both wheels, steering angle information of both wheels adjusted by the steering control input, and breakdown management adjustment messages D transmitted to the steering system for the wheel that normally works can be transmitted by any one or more of the vehicle network methods.

For example, the information A and B may be transmitted through the CAN and LIN buses and the information C and D may be transmitted through the FlexRay bus.

However, this is only an example and the vehicle network that can be used in the present disclosure is not limited thereto.

The present disclosure was made on the examples. Those skilled in the art may understand that various modifications may be made without departing from the scope of the present disclosure. Accordingly, it should be noted that the examples are provided not to limit, but to explain the present disclosure. The scope of the present disclosure is determined not by the examples, but by claims and all of differences within the equivalents should be construed as being included in the present disclosure.

What is claimed is:

1. A left-right independent steering control system, comprising:
    a steering control calculating unit that calculates steering control input for both wheels from steering input by a driver;
    wheel steering units that separately adjust steering angles of both wheels on the basis of the calculated information;
    a breakdown determining unit that determines whether the wheel steering unit for any one of both wheels breaks, by determining whether the steering angles of both wheels adjusted by the wheel steering units are the same as steering angles corresponding to the steering control input; and
    a breakdown management unit that adjusts the steering angle of the other wheel to satisfy Ackerman condition on the basis of the current steering angle information of one wheel when the breakdown determining unit determines that the wheel steering unit for the one wheel breaks.

2. The system according to claim 1, further comprising a vehicle network that transmits any one or more selected from steering input information by a driver, calculated steering control input for both wheels, steering angle information of both wheels adjusted by the wheel steering units, and a steering angle adjustment message given by the breakdown management unit, to all of modules in a vehicle.

3. The system according to claim 1, wherein
    the wheel steering unit includes:
    a first wheel steering unit that adjusts the steering angle of a left wheel on the basis of the calculated information; and
    a second wheel steering unit that adjusts the steering angle of a right wheel on the basis of the calculated information.

4. A left-right independent steering management method, comprising:
    (A) receiving steering input from a driver;
    (B) calculating steering control input corresponding to the received steering input;
    (C) separately adjusting the steering angles of both wheels on the basis of the calculated information;
    (D) determining whether there is an error in steering control for any one of both wheels by determining whether the steering angles of both wheels adjusted in the step (C) are the same as the steering angles corresponding to the steering control input calculated in the step (B);
    (E) adjusting the steering angle of the other wheel to satisfy Ackerman condition, on the basis of the current steering angle information of one wheel, when it is determined that there is an error in the steering control for the wheel in the step (D).

5. The method according to claim 4, wherein any one or more selected from steering input information by a driver, calculated steering control input for both wheels, steering angle information of both wheels adjusted by the steering control input, and a breakdown management message transmitted to the steering system for a wheel that normally works are transmitted to all of modules in a vehicle through a vehicle network.

6. The method according to claim 4, wherein the step (C) includes:
   (C-1) adjusting the steering angle of a right wheel on the basis of the calculated information; and
   (C-2) adjusting the steering angle of a right wheel on the basis of the calculated information.

* * * * *